(12) United States Patent
Choi et al.

(10) Patent No.: US 10,640,039 B2
(45) Date of Patent: May 5, 2020

(54) APPARATUS AND METHOD FOR GUIDING DRIVING INFORMATION AND VEHICLE SYSTEM HAVING THE SAME

(71) Applicants: HYUNDAI MOTOR COMPANY, Seoul (KR); KIA MOTORS CORPORATION, Seoul (KR)

(72) Inventors: Jae Seob Choi, Suwon-si (KR); Jun Hyung Kim, Suwon-si (KR); In Wan Kang, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 94 days.

(21) Appl. No.: 15/708,657

(22) Filed: Sep. 19, 2017

(65) Prior Publication Data
US 2018/0354419 A1    Dec. 13, 2018

(30) Foreign Application Priority Data

Jun. 9, 2017    (KR) .................. 10-2017-0072557

(51) Int. Cl.
*B60R 1/00*    (2006.01)
*H04N 7/18*    (2006.01)
(Continued)

(52) U.S. Cl.
CPC ........... *B60R 1/00* (2013.01); *H04N 5/23229* (2013.01); *H04N 5/247* (2013.01); *H04N 5/2624* (2013.01);
(Continued)

(58) Field of Classification Search
CPC ............... B60R 1/00; B60R 2300/301; B60R 2300/302; B60R 2300/303;
(Continued)

(56) References Cited

U.S. PATENT DOCUMENTS 8,903,592 B1    12/2014    Mariet et al.
2012/0257058 A1*    10/2012    Kinoshita ............. G06T 3/0012
                                                            348/148
(Continued)

FOREIGN PATENT DOCUMENTS

JP    2014-071631 A    4/2014
JP    2015-162173 A    9/2015
(Continued)

*Primary Examiner* — Farzana Hossain
(74) *Attorney, Agent, or Firm* — Morgan, Lewis & Bockius LLP

(57) ABSTRACT

A driving information guide apparatus of a vehicle includes a controller and a processor. The controller is communicatively connected to at least one of a sensor system and a communication device of the vehicle, and receives driving information of the vehicle. The processor collects driving information received through the controller while the vehicle runs and recognizes a current driving state of the vehicle based on the driving information. The processor determines a view mode based on a speed of the vehicle and a driving direction of the vehicle, and view-transforms images taken around the vehicle by a camera system based on a position and an angle of a virtual camera corresponding to the determined view mode. The processor thereby generates a view transformation image, and displays state information corresponding to the recognized driving state of the vehicle through the view transformation image on a display screen of the vehicle.

18 Claims, 20 Drawing Sheets

(51) Int. Cl.
*H04N 5/232* (2006.01)
*H04N 5/247* (2006.01)
*H04N 5/262* (2006.01)
*H04N 5/445* (2011.01)

(52) U.S. Cl.
CPC .......... *H04N 5/2628* (2013.01); *H04N 5/445* (2013.01); *H04N 7/181* (2013.01); *B60R 2300/301* (2013.01); *B60R 2300/302* (2013.01); *B60R 2300/303* (2013.01); *B60R 2300/605* (2013.01); *B60R 2300/607* (2013.01); *B60R 2300/804* (2013.01); *B60R 2300/8093* (2013.01)

(58) Field of Classification Search
CPC ........ B60R 2300/605; B60R 2300/607; B60R 2300/804; B60R 2300/8093; H04N 5/23229; H04N 5/247; H04N 5/2624; H04N 5/2628; H04N 5/445

USPC ........................................................ 348/148
See application file for complete search history.

(56) References Cited

U.S. PATENT DOCUMENTS

| | | | |
|---|---|---|---|
| 2016/0121895 A1 | 5/2016 | Seo | |
| 2016/0355133 A1 | 12/2016 | Kim et al. | |
| 2017/0010122 A1 | 1/2017 | Abe | |
| 2017/0054946 A1* | 2/2017 | Lee | B60R 1/00 |
| 2017/0187963 A1* | 6/2017 | Lee | G06F 3/013 |
| 2017/0253122 A1* | 9/2017 | Jun | B60K 35/00 |
| 2018/0032824 A1* | 2/2018 | Yamamoto | B60R 1/00 |

FOREIGN PATENT DOCUMENTS

| | | |
|---|---|---|
| KR | 10-2016-0044365 A | 4/2016 |
| KR | 10-2016-0053678 A | 5/2016 |
| KR | 10-2016-0142167 A | 12/2016 |

* cited by examiner

APPARATUS AND METHOD FOR GUIDING DRIVING INFORMATION AND VEHICLE SYSTEM HAVING THE SAME

CROSS-REFERENCE TO RELATED APPLICATION

This application is based on and claims the benefit of priority to Korean Patent Application No. 10-2017-0072557, filed on Jun. 9, 2017, in the Korean Intellectual Property Office, the disclosure of which is incorporated herein in its entirety by reference.

TECHNICAL FIELD

The present invention relates to an apparatus and a method for guiding driving information and a vehicle system having the same.

BACKGROUND

In recent years, systems that detect dangerous situations occurring around vehicles to drivers while driving have been realized.

For instance, systems have been developed that alert drivers of possible collision situations while driving to allow the drivers to take evasive actions when a collision with a nearby vehicle is predicted. Additionally, systems that indicate route change situations to drivers while driving to allow the drivers to become aware of changes in the traveling route have been developed.

A conventional driver guiding system displays information to be provided to the driver in guide images having the same view point, and thus it is not easy to tell the difference between the caution situation and the warning situation. Also, since the conventional driver guiding system does not provide the image of a time point at which the warning situation occurs in real time, it is difficult for the driver to quickly recognize the position where the warning situation occurs.

SUMMARY

The present disclosure addresses the above-mentioned problems occurring in the prior art while maintaining advantages achieved by the prior art.

An aspect of the present disclosure provides an apparatus and a method for guiding driving information and a vehicle system providing the same. The apparatus, method, and system are capable of changing a view transformation time point depending on various driving states generated in a vehicle to allow a driver to easily secure an extended range of view. In particular, a degree of risk is determined, and is displayed through a state bar provided by each direction of the vehicle to allow the driver to quickly recognize the driving state.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driving information guide apparatus of a vehicle includes a controller and a processor. The controller is communicatively connected to a display screen and at least one of a sensor system and a communication device, and receives driving information of the vehicle through the at least one of the sensor system and the communication device. The processor is communicatively connected to the controller and is configured to collect driving information received through the controller and at least one of the sensor system and the communication device while the vehicle runs and recognize a current driving state of the vehicle based on the collected driving information. The processor further determines a view mode based on a speed of the vehicle and a driving direction of the vehicle, and view-transforms images from around the vehicle, which are taken by a camera system, based on a position and an angle of a virtual camera corresponding to the determined view mode. The processor thereby generates a view transformation image for display on the display communicatively connected to the processor through the controller, and further displays state information corresponding to the recognized driving state of the vehicle through the view transformation image on the display screen communicatively connected through the controller.

According to another aspect of the present disclosure, a driving information guide method includes obtaining images around a vehicle, which are taken by a camera system of the vehicle while the vehicle runs. Driving information of the vehicle, including a speed of the vehicle and a driving direction of the vehicle, is collected by a processor of the vehicle communicatively connected to the camera system of the vehicle while the vehicle runs. A current driving state of the vehicle is identified based on the collected driving information. A view mode is determined by the processor based on the speed of the vehicle and the driving direction of the vehicle, and the images around the vehicle are view-transformed by the processor based on a position and an angle of a virtual camera corresponding to the determined view mode to generate a view transformation image. State information corresponding to the recognized driving state of the vehicle through the view transformation image is displayed on a display communicatively connected to the processor of the vehicle.

According to another aspect of the present disclosure, a vehicle system includes an interface that displays driving state information of a vehicle through a display screen, a camera system that takes images around the vehicle while the vehicle runs, a sensor system that measures a driving state of the vehicle while the vehicle runs, a communication device that communicates with a nearby vehicle to receive information about the nearby vehicle, and a driving information guide device. The driving information guide device collects driving information of the vehicle while the vehicle runs to recognize a current driving state of the vehicle based on the collected driving information. The driving information guide device view-transforms the images taken around the vehicle, which are taken by the camera system, based on a position and an angle of a virtual camera corresponding to a view mode determined depending on a speed of the vehicle and a driving direction of the vehicle to generate a view transformation image. The driving information guide device then displays, on the display screen of the interface, state information corresponding to the recognized driving state of the vehicle through the view transformation image.

According to the above, the view transformation time point is changed depending on various driving states generated in the vehicle to allow the driver to easily secure extended range of view, and the driver may quickly recognize the driving state by dividing the degree of risk in the state information according to the driving states into the multiple stages and guiding the state information of each stage through the state bar provided by each direction of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
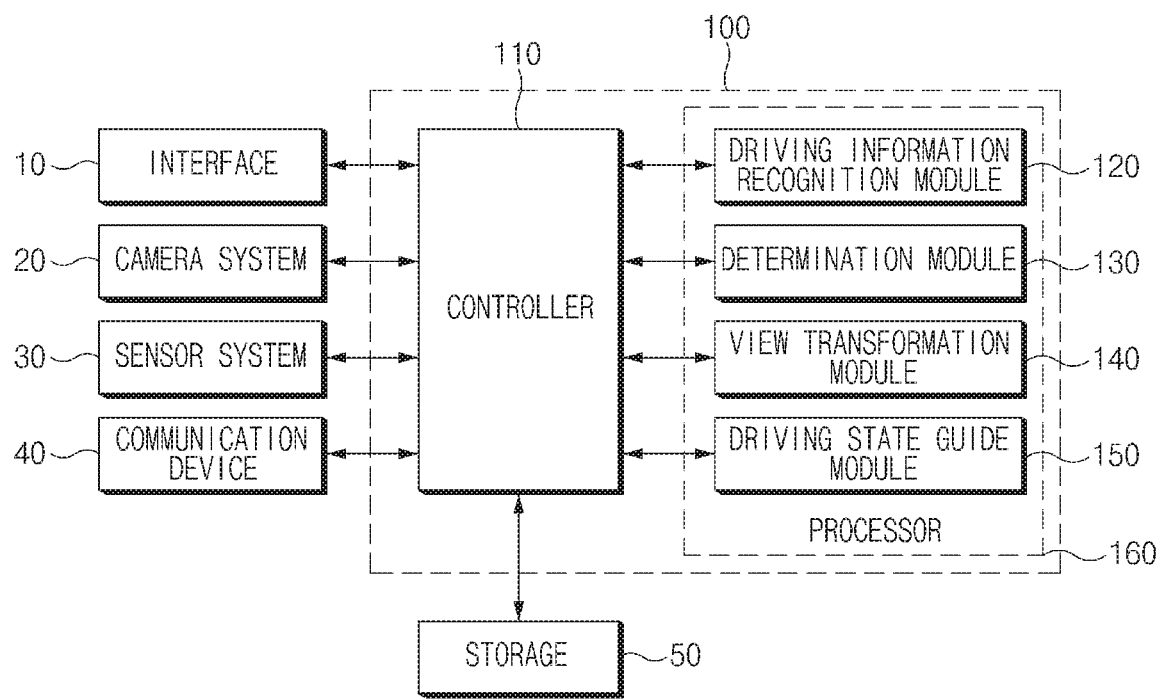
FIG. 1 is a block diagram showing an illustrative vehicle system to which a driving information guide apparatus is applied according to an exemplary embodiment of the present disclosure.

Hereinafter, exemplary embodiments of the present inventive concepts will be described in detail with reference to the accompanying drawings. In the drawings, the same reference numbers will be used throughout to designate the same or equivalent elements. In addition, a detailed description of well-known features or functions may not be provided in order not to unnecessarily obscure the gist of the present disclosure.

In describing elements of exemplary embodiments of the present inventive concepts, the terms $1^{st}$, $2^{nd}$, first, second, A, B, (a), (b), and the like may be used herein. These terms are only used to distinguish one element from another element, but do not limit the corresponding elements or indicate any order or priority between the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle system to which a driving information guide apparatus is applied according to an exemplary embodiment of the present disclosure.

Referring to FIG. 1, the vehicle system may include an interface 10, a camera system 20, a sensor system 30, a communication device 40, a storage 50, and a driving information guide apparatus 100.

The interface 10 may include an input device to receive a control instruction and an output device to output an operation state of the driving information guide apparatus 100 and guide results. In particular, the interface 10 may be a user input/output interface through which user input instructions can be received and through which messages and information can be communicated to the user.

Here, the input device may include a key button, a mouse, a joystick, a jog shuttle, a stylus pen, and the like. In addition, the input device may include a soft key implemented on a display such as a touch-sensitive display.

The output device may include the display and/or a voice output device, such as a speaker. The display may display a driving state guide screen provided by the driving information guide apparatus 100, for example.

In a case that a touch sensor, e.g., a touch film, a touch sheet, a touch pad, etc., is included in the display, the display may operate as a touch screen, and the input device and the output device may be implemented in an integrated form within the display.

The display may include at least one of a liquid crystal display (LCD), a thin film transistor-liquid crystal display (TFT-LCD), an organic light-emitting diode (OLED), a flexible display, a field emission display (FED), or a three-dimensional (3D) display.

The camera system 20 may include one or more cameras installed at front, rear, left, and/or right sides of the vehicle to take images around the vehicle. In some embodiments, cameras may be provided to each of front, rear, left, and right sides of the vehicle. The camera system 20 may take the images around the vehicle, for example, a forward image, a backward image, a leftward image, and a rightward image around the vehicle, and transmit the images to the driving information guide apparatus 100.

The sensor system 30 may include one or more sensors including at least one sensor to sense information around the vehicle while the vehicle drives. As an example, the sensor system 30 may include a sensor that senses a current state of the vehicle and/or components or systems of the vehicle, e.g., an on/off state of a turn signal, a driving lane, a driving route; a sensor that senses a position and/or a speed of the vehicle; and a sensor that detects obstacles around the vehicle and senses positions and speed of the obstacles. Here, each sensor may be implemented by an ultrasonic sensor, a radar, an infrared ray sensor, a scanner, a camera, combinations thereof, and the like.

The sensor system 30 should not be limited thereto or thereby as long as the sensor system 30 may sense the information around the vehicle to provide the sensing data/information and functionality described herein.

The communication device 40 may include a communication module or transceiver that supports a communication interface with electrical equipments and controllers included in the vehicle and/or systems equipped in the vehicle. For instance, the communication device 40 may receive information measured by the sensor system 30 and transmit the received information to the driving information guide apparatus 100, and may also transmit driving state guide information received from the driving information guide apparatus 100 to the interface 10 and/or the storage 50.

The communication device 40 may include a module supporting a vehicle network communication, such as a controller area network (CAN) communication, a local interconnect network (LIN) communication, a Flex-ray communication, or the like.

The communication device 40 may include a module for a wireless internet access or a module for a short range communication. As a wireless internet technology, the communication device 40 may support communications using various wired or wireless communication standards including wireless LAN (WLAN), wireless broadband (Wibro), Wi-Fi, world interoperability for microwave access (Wimax), and the like. The communication device 40 may additionally or alternatively support communications using short range communication standards including Bluetooth, ZigBee, ultra-wideband (UWB), radio frequency identification (RFID), infrared data association (IrDA), and the like as a short range communication technology.

In this case, the communication device 40 may transmit the information about the vehicle to nearby vehicles or receive information about the nearby vehicles via a vehicle-to-vehicle (V2V) communication with the nearby vehicles located near the vehicle having the communication device 40.

The storage 50 may store data and/or algorithms and program instructions used to operate the driving information guide apparatus 100.

As an example, the storage 50 may store the information measured by the sensor system 30 and/or the information about the nearby vehicles, which is received through the communication device 40. In addition, the storage 50 may store information about a view mode, driving information about each view mode, and information set for a view transformation. In addition, the storage 50 may store machine-readable programming instructions and/or algorithms to carry out the view transformation in response to the view mode determined depending on the driving state.

In addition, the storage 50 may store information to construct a driving state guide screen according to the driving state.

In the embodiment shown in FIG. 1, the data and/or algorithms used to operate the driving information guide apparatus 100 may be stored in the storage 50 of the vehicle system. However, in some embodiments, separate storage devices may be used in the driving information guide apparatus 100 to store data and algorithms.

In the present embodiment, the storage 50 may include one or more storage medium/media including transitory and/or non-transitory storage media, such as a random access memory (RAM), a static random access memory (SRAM), a read-only memory (ROM), a programmable read-only memory (PROM), an electrically erasable programmable read-only memory (EEPROM), etc.

The driving information guide apparatus 100 may collect the driving information of the vehicle and/or the information around the vehicle from the sensor system 30 and/or the communication device 40. The driving information guide apparatus 100 may recognize a present driving state of the vehicle based on the collected information. In this case, the driving information guide apparatus 100 may determine the view mode depending on the recognized present driving state of the vehicle and may carry out the view transformation based on the determined view mode, as described in further detail below, to guide the driving state of the vehicle to the driver.

The driving information guide apparatus 100 may determine the view mode corresponding to the driving state of the vehicle whenever a predetermined view transformation event occurs and, in response to the event occurrence, may provide the driving state guide screen, which is view-transformed according to the determined view mode, to the driver.

In this case, the driving information guide apparatus 100 may include a controller 110 and a processor 160. The processor 160 has an associated non-transitory memory storing software instructions which, when executed by the processor 160, provides the functionalities of a driving information recognition module 120, a determination module 130, a view transformation module 140, and a driving state guide module 150. Here, the controller 110 may process signals transmitted between elements of the driving information guide apparatus 100, and in particular may process signals communicated between the processor 160 and the interface 10, camera system 20, sensor system 30, communication device 40, and storage 50. The processor 160 may take the form of one or more processor(s) and associated memory storing program instructions, and in some examples the one or more processor(s) may be used to implement the functions of both the controller 110 and the processor 160.

The driving information recognition module 120 of processor 160 may collect the driving information of the vehicle and/or the information around the vehicle from the sensor system 30 (e.g., in cases in which the sensor system 30 directly senses the driving information and/or the information around the vehicle) and/or the communication device 40 (e.g., in cases in which the driving information and/or the information around the vehicle is collected by other devices/sensors/systems, and is communicated to the driving information guide apparatus 100 through the communication device 40). The driving information recognition module 120 may recognize (e.g., detect, determine, or identify) the present driving state of the vehicle based on the collected information.

As an example, the driving information recognition module 120 may recognize at least one of a speed of the vehicle, a driving route of the vehicle, a lane change state of the vehicle, a position of a driving lane of the vehicle (e.g., a position of the vehicle within a driving lane), a lane departure state of the vehicle, an operation state of an autonomous driving mode of the vehicle, an obstacle approach state with respect to the vehicle, a distance between the vehicle and the obstacle, or a relative speed between the vehicle and the obstacle.

The determination module 130 of processor 160 may determine the view mode based on the present driving state of the vehicle recognized by the driving information recognition module 120. In this case, the determination module 130 may verify whether a change event, such as a deceleration event, an acceleration event, a lane change event, or the like, associated with a driving situation occurs as a result to of a driver's action or intention and may switch the view mode according to the verified result. In addition, the determination module 130 may verify whether a change event, such as the lane departure event, the obstacle approach event, etc., associated with the situation around the vehicle occurs and may switch the view mode according to the verified result.

The determination module 130 may determine the view mode in response to an input signal input thereto by the driver and switch to the determined view mode regardless of the occurrence of the change event of the situation around the vehicle.

In the view mode of the present embodiment, a position and an angle of a virtual camera applied to the view transformation may be varied depending on positions at which the change event of the driving situation and/or the change event of the situation around the vehicle occur(s).

Embodiments associated with the view mode in accordance with the occurrence of the event will be described with reference to FIGS. 2A and 2B.

Figure 2A:
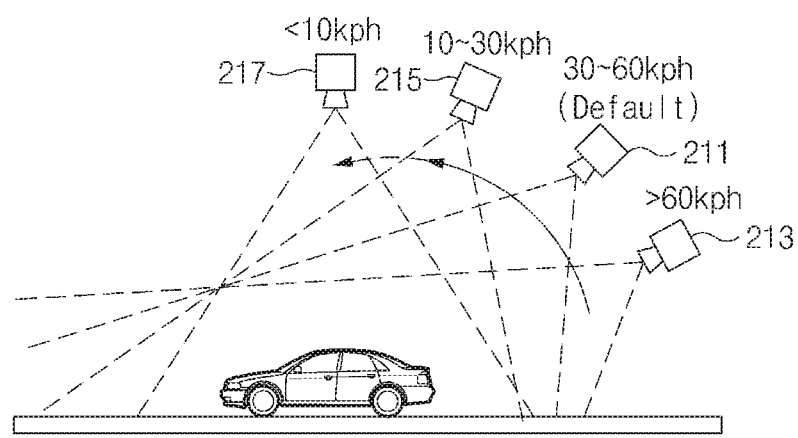
FIGS. 2A-2B, 3A-3F, 4A-4C, 5A-5C, 6A-6C, 7A-7C, and 8A-8I are illustrative views showing an operation of a driving information guide apparatus according to an exemplary embodiment of the present disclosure.

Referring to FIG. 2A, the view mode may include first, second, third, and fourth modes in which the position and the angle in forward and backward directions of the virtual camera are set to have different values according to the change event of the driving situation caused by the speed of the vehicle.

The first mode may be set to the position and the angle, which become references with respect to the forward and backward directions of the virtual camera, and in this case, the set position and angle of the virtual camera may correspond to a reference numeral of 211 of FIG. 2A. The determination module 130 may set the first mode as the view mode in a case that the speed of the vehicle is in a range from about 30 [kph] to about 60 [kph].

The second mode may correspond to a case in which the vehicle drives at high speed, and in this case, the set position and angle of the virtual camera may correspond to a reference numeral of 213 of FIG. 2A. As indicated by the reference numeral of 213, the position of the virtual camera in the forward and backward directions in the second mode may be set behind the reference position, and the angle of the virtual camera in the second mode may be set to an angle smaller than the reference angle. The determination module 130 may set the second mode as the view mode in a case that the speed of the vehicle exceeds about 60 [kph].

The third mode may correspond to a case in which the vehicle drives at low speed, and in this case, the set position and angle of the virtual camera may correspond to a reference numeral of 215 of FIG. 2A. As indicated by the reference numeral of 215, the position of the virtual camera in the forward and backward directions in the third mode may be set ahead of the reference position, and the angle of the virtual camera in the third mode may be set to an angle greater than the reference angle. The determination module 130 may set the third mode as the view mode in a case that the speed of the vehicle is equal to or greater than about 10 [kph] and smaller than about 30 [kph].

The fourth mode may correspond to a case in which the vehicle drives at very low speed, and in this case, the set position and angle of the virtual camera may correspond to a reference numeral of 217 of FIG. 2A. As indicated by the reference numeral of 217, the position of the virtual camera in the forward and backward directions in the fourth mode may be set ahead of the position in the third mode, and the angle of the virtual camera in the fourth mode may be set to an angle greater than the angle in the third mode. As an example, the position of the virtual camera in the fourth mode may correspond to a center position in the forward and backward directions of the vehicle (e.g., a position above a center of the vehicle along the front-to-back axis of the vehicle), and the angle may be set to about 90 degrees with respect to the center position in the forward and backward directions of the vehicle The determination module 130 may set the fourth mode as the view mode in a case that the speed of the vehicle is smaller than about 10 [kph].

Figure 2B:
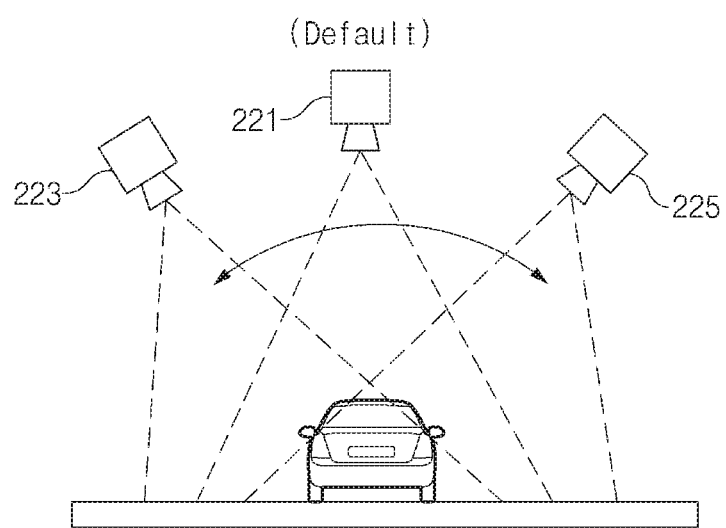

In addition, referring to FIG. 2B, the view mode may include fifth and sixth modes in which the position and the angle in left and right directions of the virtual camera are differently set according to the change event of the driving situation caused by the lane change and the change event of the situation around the vehicle caused by the lane departure.

The position and the angle of the virtual camera along the front-to-back axis of the vehicle that become references for the left and right directions of the virtual camera may be set equal to those of the first mode in the fifth and sixth modes.

The fifth mode may correspond to a case in which the vehicle moves to the left direction, and in this case, the set position and angle of the virtual camera may correspond to a reference numeral of 223 of FIG. 2B along the right-to-left axis of the vehicle. As indicated by the reference numeral of 223, the position of the virtual camera in the left and right directions in the fifth mode may be set to the left of the reference position along the right-to-left axis of the vehicle, and the angle of the virtual camera in the fifth mode may be set to an angle smaller than the reference angle to the left direction along the right-to-left axis of the vehicle.

The determination module 130 may set the fifth mode as the view mode in a case that a left turn signal of the vehicle is turned on or the vehicle leaves a present driving lane by crossing a left line with respect to a driving direction of the vehicle. In this case, the determination module 130 may determine one of the first to fourth modes depending on the speed of the vehicle and the fifth mode as the view mode.

The sixth mode may correspond to a case in which the vehicle moves to the right direction, and in this case, the set position and angle of the virtual camera may correspond to a reference numeral of 225 of FIG. 2B along the right-to-left axis of the vehicle. As indicated by the reference numeral of 225, the position of the virtual camera in the left and right directions in the sixth mode may be set to the right of the reference position along the right-to-left axis of the vehicle, and the angle of the virtual camera in the sixth mode may be set to an angle smaller than the reference angle to the right direction along the right-to-left axis of the vehicle.

The determination module 130 may set the sixth mode as the view mode in a case that a right turn signal of the vehicle is turned on or the vehicle leaves the present driving lane by crossing a right line with respect to the driving direction of the vehicle. In this case, the determination module 130 may determine one of the first to fourth modes depending on the speed of the vehicle and the sixth mode as the view mode.

The view transformation module 140 of processor 160 may perform the view transformation on the images around the vehicles, e.g., the forward image, the backward image, the leftward image, and the rightward image around the vehicle, which are taken by the camera(s) of the camera system 20, based on the set position and angle of the virtual camera and may synthesize the images that are view-transformed to generate a view transformation image.

The view transformation module 140 may generate the view transformation image with respect to an input image according to the position and the angle of the virtual camera corresponding to the view mode set to a default value.

Figure 3A:
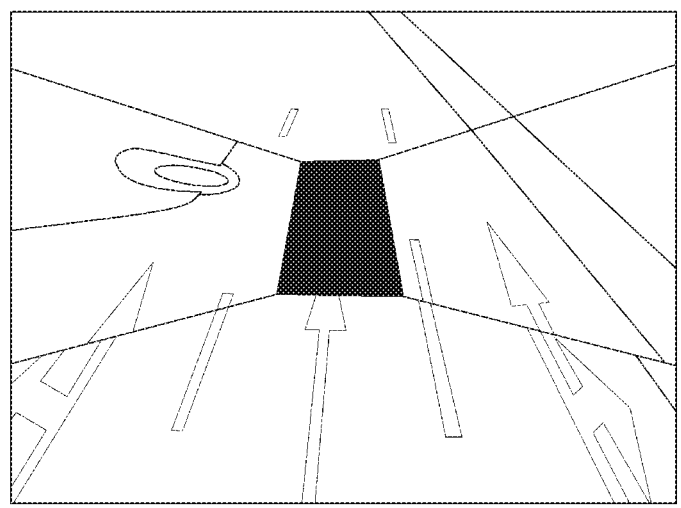

As an example, the view transformation module 140 may adjust the reference position and the reference angle of the virtual camera in the forward and backward directions and the left and right directions in response to the first mode, view-transform the input image(s) by using the adjusted virtual camera, and synthesize the view-transformed image (s) to generate the view transformation image. The view transformation image generated corresponding to the first mode may be represented as shown in FIG. 3A.

In addition, the view transformation module 140 may adjust the position and the angle of the virtual camera based on the view mode determined by the determination module 130 due to the occurrence of the change event and may generate the view transformation image with respect to the input image based on the adjusted virtual camera.

Figure 3B:
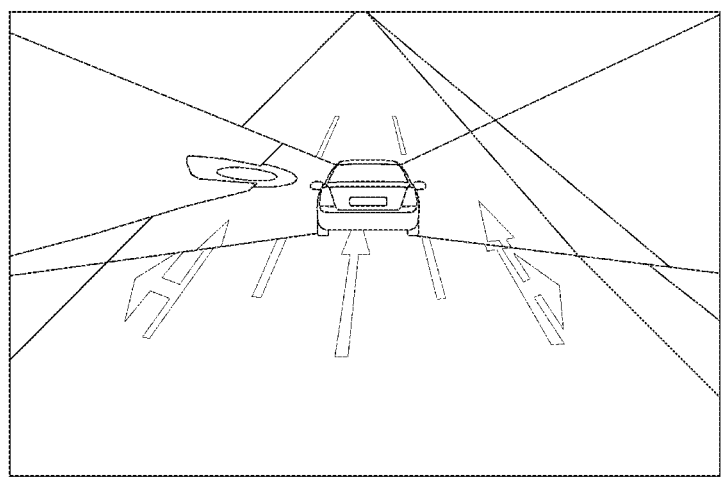

As an example, in the case that the speed of the vehicle exceeds about 60 [kph] and the second mode is determined as the view mode by the determination module 130, the view transformation module 140 may perform the view transformation on the input image based on the position and the angle of the virtual camera, which are set for the determined second mode, and may synthesize the view-transformed images to generate the view transformation image. The view transformation image generated in the second mode may be represented as shown in FIG. 3B.

Figure 3C:
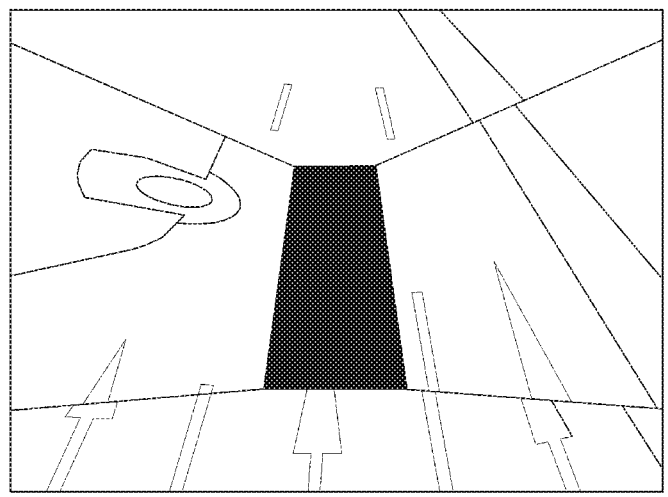

In the case that the vehicle drives at low speed, for example, the speed of the vehicle is equal to or greater than about 10 [kph] and smaller than about 30 [kph], and the third mode is determined as the view mode by the determination module 130, the view transformation module 140 may perform the view transformation on the input image based on the position and the angle of the virtual camera, which are set for the determined third mode, and may synthesize the view-transformed images to generate the view transformation image. The view transformation image generated in the third mode may be represented as shown in FIG. 3C.

Figure 3D:
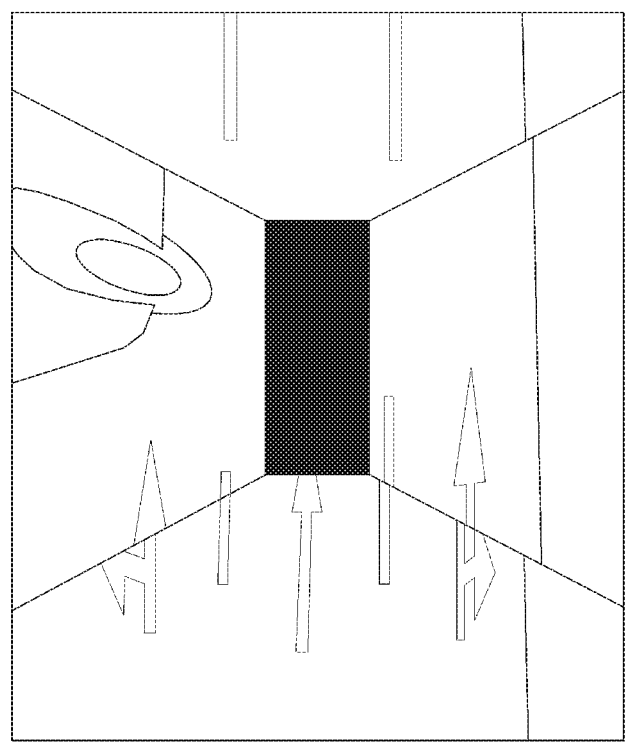

In addition, in the case that the vehicle drives at very low speed, for example, the speed of the vehicle is smaller than about 10 [kph], and the fourth mode is determined as the view mode by the determination module 130, the view transformation module 140 may perform the view transformation on the input image based on the position and the angle of the virtual camera, which are set for the determined fourth mode, and may synthesize the view-transformed images to generate the view transformation image. The view transformation image generated in the fourth mode may be represented as shown in FIG. 3D.

Here, if other change events do not occur except for the speed of the vehicle, the view transformation module 140 may perform the view transformation based on one of the second mode to the fourth mode. In this case, the view transformation module 140 may perform the view transformation on the basis of the reference position and the reference angle in the left and right directions of the virtual camera.

Figure 3E:
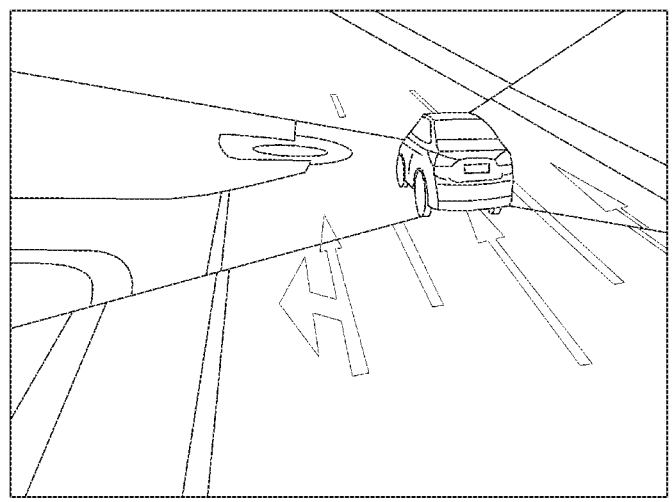

As another example, in the case that the left turn signal is turned on and the fifth mode is determined as the view mode by the determination module 130, the view transformation module 140 may perform the view transformation on the input image based on the position and the angle of the virtual camera, which are set for the determined fifth mode, and may synthesize the view-transformed images to generate the view transformation image. The view transformation image generated in the fifth mode may be represented as shown in FIG. 3E.

Figure 3F:
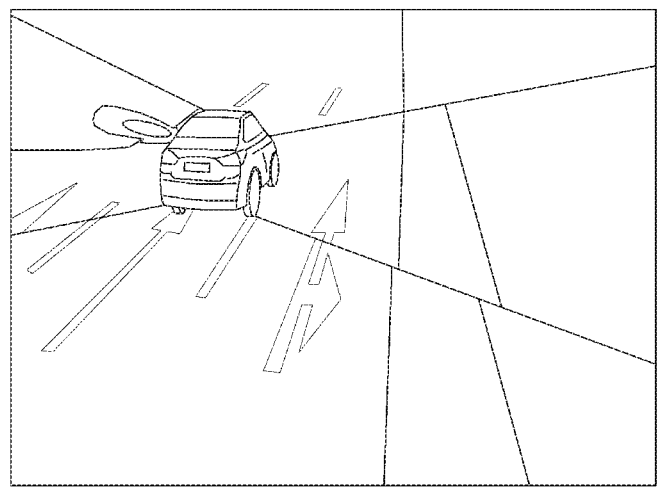

In addition, in the case that the vehicle leaves the present driving lane by crossing the right line with respect to the driving direction and the sixth mode is determined as the view mode by the determination module 130, the view transformation module 140 may perform the view transformation on the input image based on the position and the angle of the virtual camera, which are set for the determined sixth mode, and may synthesize the view-transformed images to generate the view transformation image. The view transformation image generated in the sixth mode may be represented as shown in FIG. 3F.

Meanwhile, in the case that the left turn signal is turned on while the vehicle drives at the speed smaller than about 10 [kph] and the fourth and fifth modes are determined as the view mode by the determination module 130, the view transformation module 140 may perform the view transformation on the input image based on the position and the angle of the virtual camera, which are set for the determined fourth and fifth modes, and may synthesize the view-transformed images to generate the view transformation image.

FIGS. 3A to 3F show the first to sixth modes, but the view mode may further include a mode to provide a view between at least two modes based on a value obtained by interpolating parameter values respectively corresponding to the at least two modes among the first to sixth modes. Accordingly, the view mode may be continuously switched, and thus the view transformation image may be provided without sense of difference as driving parameters (e.g., vehicle speed and driving position with respect to lanes) change continuously.

The driving state guide module 150 of processor 160 may transmit the view transformation image generated by the view transformation module 140 to the interface 10 to guide the present driving state of the vehicle through a display screen. In this case, the driving state guide module 150 may add the state information corresponding to the present driving state of the vehicle to the view transformation image to output the state information with the image through the display screen. Here, the state information corresponding to the driving state may be determined as detailed in the following Table 1.

TABLE 1

| | Display information classification | Driving information contents | Recognition method classification | Driving information classification | Frequency of display |
|---|---|---|---|---|---|
| (a) | Lane recognition and curvature guide | Displaying virtual curved lane during left and right turns | Image recognition information | Lane information | Event |
| | | Arrow in driving lane | | | Event |
| | | Driving lane departure warning of own vehicle | | | Always |
| | | Line crossing warning of nearby vehicle | | | Event |
| | | Forward road curvature guide | | | Event |
| (b) | Obstacle detection | Pot-hole, speed bump | | | Event |
| | | Unexpected obstacle (pedestrian and wild animal) | | Road condition | Event |
| | | Median strip, curb | | | Event |
| (c) | BCW sensor recognition | Displaying rear approach vehicle (based on BCW) | Distance measuring information | Vehicle recognition | Event |
| (d) | Vehicle speed information | Speed information of vehicles in the same lane and in nearby lane (including information on absolute speed and relative speed) | | | Always |
| (e) | Real-time traffic information and vehicle position information | Providing distance between vehicles, speed, selection for lane | | Accident prevention | Always |
| | | Driving route guide | Navigation information | Driving route | Always |

TABLE 1-continued

| Display information classification | Driving information contents | Recognition method classification | Driving information classification | Frequency of display |
|---|---|---|---|---|
| (f) Position information and image recognition | by taking into account real-time traffic information Destination, buildings easy to recognize | | Landmark | Event |
| | Intersection, junction | | Vehicle route change point | Event |
| (g) Own vehicle speed information | Changing display area depending on speed of vehicle | Own vehicle information | View change | Always |
| (h) Turn signal and steering information | Changing display area depending on turn signal and steering of own vehicle | | | Event |
| (i) Image recognition and V2V | Determining approach of nearby vehicle based on turn signal of nearby vehicle (V2V, image recognition) | Other information (sensor fusion) | | Event |
| | Traffic light (V2V, image recognition) | | | Event |

As an example, in a case that an obstacle or a nearby vehicle exists around the vehicle, the driving state guide module 150 may add the state information based on a distance between the vehicle and the obstacle (or the nearby vehicle), e.g., enough, close, or very proximate, to the view transformation image.

In addition, in the case that the obstacle or the nearby vehicle exists around the vehicle, the driving state guide module 150 may add the state information based on a relative speed between the vehicle and the obstacle (or the nearby vehicle), e.g., maintain/farther away, close, or very proximate, to the view transformation image.

In addition, the driving state guide module 150 may add the state information based on a position of the driving lane of the vehicle, e.g., normal, proximate, or crossing, to the view transformation image.

In addition, the driving state guide module 150 may add the state information based on a lane change of the vehicle, e.g., dangerous or possible, to the view transformation image.

In addition, the driving state guide module 150 may add information about the driving route of the vehicle or the guide route to the view transformation image.

In addition, the driving state guide module 150 may add the state information according to the degree of driving risk based on the approach state of the obstacle (or the nearby vehicle) around the vehicle, the position of the driving lane, and the lane change state, e.g., safety, caution, or warning, to the view transformation image.

Here, the state information may be displayed in various types, such as an image, an icon, an emoticon, a character, a number, a special character, a color, etc.

In addition, the driving state guide module 150 may divide the degree of driving risk of the vehicle into multiple stages and divide the state bar guiding the state information around the vehicle into plural parts by taking into account each direction to display the degree of driving risk and the state bars in the view transformation image.

Embodiments that display the state information according to the degree of driving risk of the vehicle through the view transformation image will be described in detail with reference to FIGS. 4A-4C, 5A-5C and 6A-6C.

FIGS. 4A-4C, 5A-5C and 6A-6C show the embodiments that guide the state information on the degree of driving risk of the vehicle by displaying the state bar around the vehicle in the view transformation image.

Figures 4A, 4B, 4C:
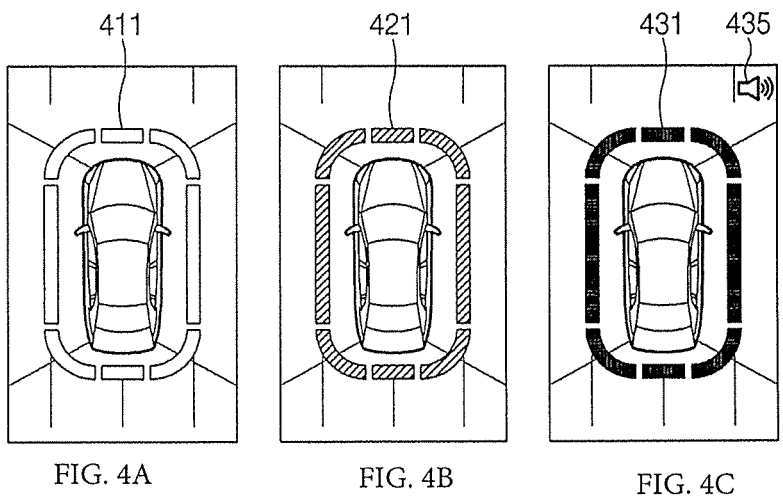

FIGS. 4A-4C shows the embodiment that guides the state information on the degree of driving risk of the vehicle according to a first embodiment.

Referring to FIGS. 4A-4C, the state bar may be divided into plural parts according to directions relative to (or surrounding) the vehicle. For instance, the state bar may be divided into eight state bars respectively corresponding to a front side, a left front side, a right front side, a left side, a right side, a rear side, a left rear side, and a right rear side of the vehicle. In this case, the driving state guide module 150 may guide the state information around the vehicle with respect to the front side, the left front side, the right front side, the left side, the right side, the rear side, the left rear side, and the right rear side of the vehicle using the eight state bars displayed around the vehicle.

Here, the driving state guide module 150 may classify the state information associated with the degree of driving risk into three stages of safe, caution, and warning, and the state information corresponding to each of the three stages may be guided through the eight state bars.

In this case, the state information of each stage with respect to the degree of driving risk may be displayed by making a contrast, a pattern, and/or a color different as shown in diagrams in FIGS. 4A-4C. Here, a reference numeral 411 in FIG. 4A may represent a safe state, a reference numeral 421 in FIG. 4B may represent a caution state, and a reference numeral 431 in FIG. 4C may represent a warning state. In a case that the degree of driving risk of the vehicle is the warning state, the driving state guide module 150 may additionally output through the interface 10 an alarm sound and a corresponding icon represented by a reference numeral of 435.

Figures 5A, 5B, 5C:
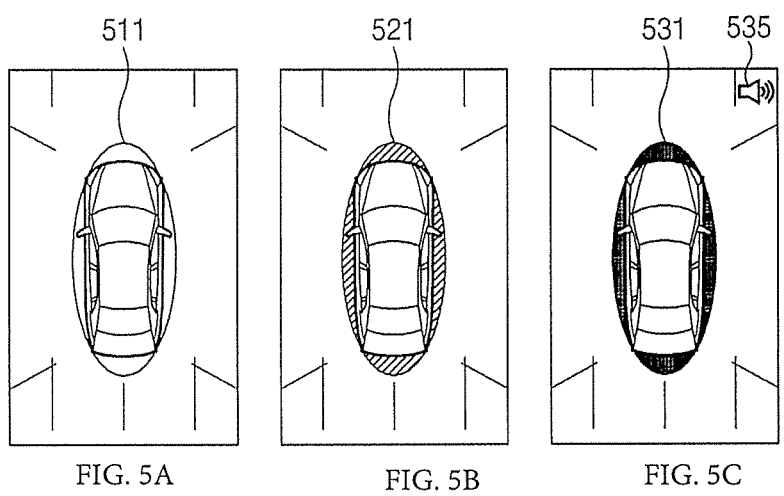

FIGS. 5A-5C shows the embodiment that guides the state information on the degree of driving risk of the vehicle according to a second embodiment.

Referring to FIGS. 5A-5C, the state bar may be divided into plural parts according to directions of the vehicle. For instance, the state bar may be divided into four state bars respectively corresponding to a front side, a left side, a right side, and a rear side of the vehicle. In this case, the driving state guide module 150 may guide the state information around the vehicle with respect to the front side, the left side, the right side, and the rear side of the vehicle using the four state bars displayed around the vehicle.

Here, the driving state guide module 150 may classify the state information associated with the degree of driving risk into three stages of safe, caution, and warning, and the state information corresponding to each of the three stages may be guided through the four state bars.

In this case, the state information of each stage with respect to the degree of driving risk may be displayed by making a contrast, a pattern, and/or a color different as shown in diagrams in FIGS. 5A-C. Here, a reference numeral 511 in FIG. 5A may represent a safe state, a reference numeral 521 in FIG. 5B may represent a caution state, and a reference numeral 531 in FIG. 5C may represent a warning state. In a case that the degree of driving risk of the vehicle is the warning state, the driving state guide module 150 may additionally output through the interface 10 an alarm sound and a corresponding icon represented by a reference numeral of 535.

Figures 6A, 6B, 6C:
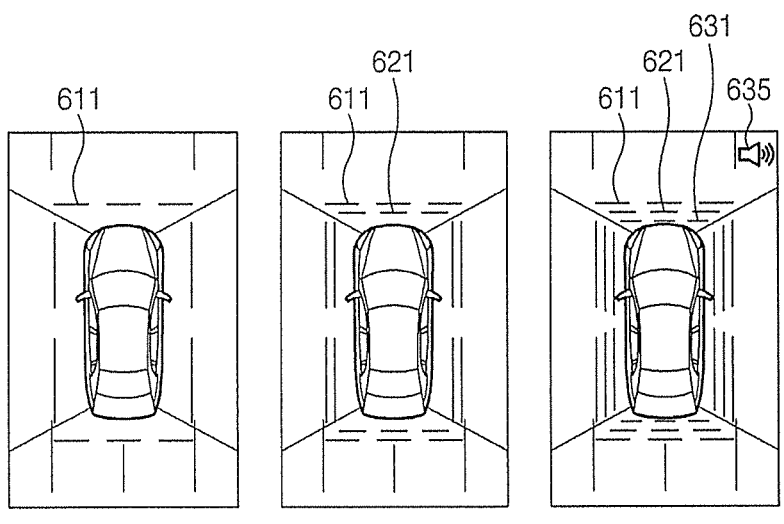

FIG. 6A-C shows the embodiment that guides the state information on the degree of driving risk of the vehicle according to a third embodiment.

Referring to FIG. 6A-6C, the state bar may be divided into plural parts according to directions of the vehicle. For instance, the state bar may be divided into ten state bars respectively corresponding to a front left side, a front side, a front right side, a left front side, a left rear side, a right front side, a right rear side, a rear left side, a rear side, and a rear right side of the vehicle. In this case, the driving state guide module 150 may guide the state information around the vehicle with respect to the front left side, the front side, the front right side, the left front side, the left rear side, the right front side, the right rear side, the rear left side, the rear side, and the rear right side of the vehicle using the ten state bars displayed around the vehicle.

Here, the driving state guide module 150 may classify the state information associated with the degree of driving risk into three stages of safe, caution, and warning, and the state information corresponding to each of the three stages may be guided through the state bars.

In this case, the state information of each stage with respect to the degree of driving risk may be displayed by differentiating the number of the state bars displayed around the vehicle as shown in FIGS. 6A-6C. As an example, in the case that the degree of driving risk of the vehicle is the safe state, the driving state guide module 150 may display the safe state on the view transformation image using one state bar corresponding to a reference numeral of 611 in each direction as shown in FIG. 6A. In the case that the degree of driving risk of the vehicle is the caution state, the driving state guide module 150 may display the caution state on the view transformation image using two state bars corresponding to reference numerals of 611 and 621 in each direction as shown in FIG. 6B. Here, the two state bars corresponding to reference numerals of 611 and 621 may be displayed in different contrasts, different patterns, and/or different colors.

Meanwhile, in the case that the degree of driving risk of the vehicle is the warning state, the driving state guide module 150 may display the warning state on the view transformation image using three state bars corresponding to reference numerals of 611, 621, and 631 in each direction as shown in FIG. 6C. Here, the three state bars corresponding to reference numerals of 611, 621, and 631 may be displayed in different contrasts, different patterns, and/or different colors.

In the case that the degree of driving risk of the vehicle is the warning state, the driving state guide module 150 may additionally output through the interface 10 an alarm sound and a corresponding alarm icon represented by a reference numeral of 635.

In the embodiments shown in FIGS. 4A-4C, 5A-5C and 6A-6C, the state information according to the degree of driving risk of the vehicle may be identically displayed in each direction around the vehicle, but the driving state guide module 150 may selectively display different state information, e.g., the state information correspond to the warning, in each direction in which the change event occurs by taking into account the situation around the vehicle. This will be described in detail with reference to FIGS. 7A to 7C.

Figure 7A:
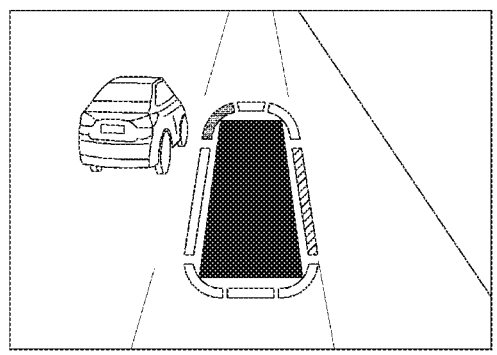
Figure 7B:
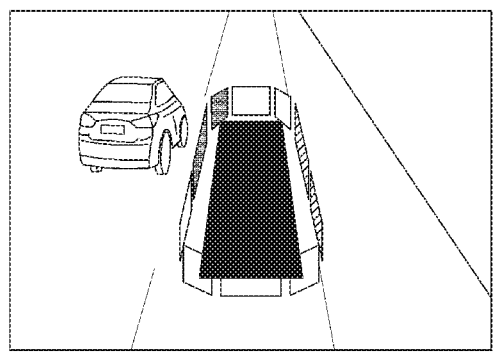
Figure 7C:
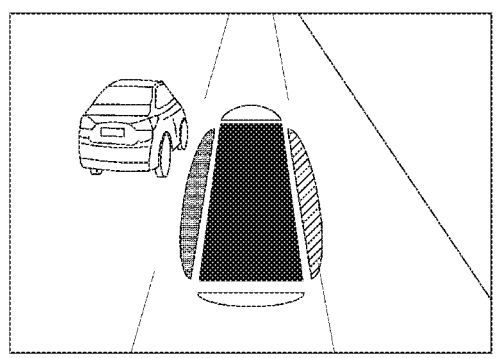

FIGS. 7A to 7C show embodiments that display the state information in different forms while the same event occurs in the case that the change event associated with the situation around the vehicle occurs due to the nearby vehicle approaching to the left front side of the vehicle and the change event associated with the driving situation occurs by the vehicle leaving the present driving lane to cross the right line with respect to the driving direction.

FIG. 7A shows the embodiment that guides the state information associated with the degree of driving risk of the vehicle in each direction according to a first embodiment. Referring to FIG. 7A, since the degree of the driving risk in the left front side of the vehicle is the warning state, the driving state guide module 150 may display the warning state through the state bar corresponding to the left front side among the eight state bars respectively corresponding to the directions. In addition, since the degree of driving risk in the right side of vehicle is the caution state, the driving state guide module 150 may display the caution state through the state bar corresponding to the right side among the eight state bars respectively corresponding to the directions.

FIG. 7B shows the embodiment that guides the state information associated with the degree of driving risk of the vehicle in each direction according to a second embodiment. Referring to FIG. 7B, since the degree of the driving risk in the left front side of the vehicle is the warning state, the driving state guide module 150 may display the warning state through the state bars respectively corresponding to the front left side and the left front side among the ten state bars respectively corresponding to the directions. In addition, since the degree of driving risk in the right side of the vehicle is the caution state, the driving state guide module 150 may display the caution state through the state bars respectively corresponding to the right front side and the right rear side among the ten state bars respectively corresponding to the directions.

FIG. 7C shows the embodiment that guides the state information associated with the degree of driving risk of the vehicle in each direction according to a third embodiment. Referring to FIG. 7C, since the degree of the driving risk in the left front side of the vehicle is the warning state, the driving state guide module 150 may display the warning state through the state bar corresponding to the left side among the four state bars respectively corresponding to the directions. In addition, since the degree of driving risk of the right side of vehicle is the caution state, the driving state guide module 150 may display the caution state through the state bar corresponding to the right side among the four state bars respectively corresponding to the directions.

FIGS. 8A to 8I show illustrative view transformation images through which the state information associated with the driving situation occurring in each view mode is displayed. Embodiments described hereinafter illustratively display the state information with respect to the front side, the left front side, the right front side, the left side, the right side, the rear side, the left rear side, and the right rear side of the vehicle using the eight state bars, but they should not be limited thereto or thereby.

Figure 8A:
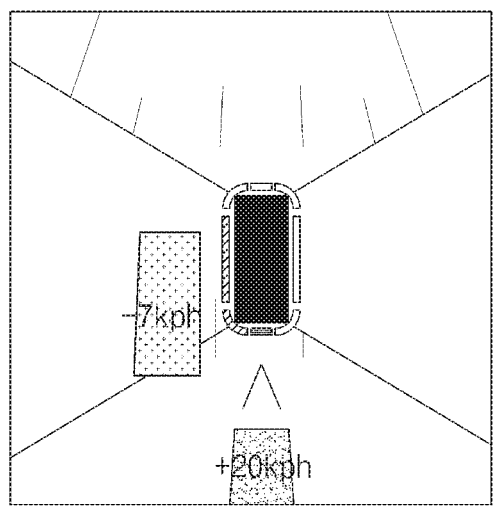

FIG. 8A shows the embodiment in which another vehicle approaching to the vehicle at low speed in the left side of the vehicle exists and another vehicle approaching at high speed in the rear side of the vehicle exists while the vehicle drives at low speed of about 30 [kph] or less.

Referring to FIG. 8A, the driving state guide module 150 may display an image and relative speed information corresponding to the other vehicle approaching to the vehicle at low speed in the left side and an image and relative speed information of another further vehicle approaching to the vehicle at high speed in the rear side with respect to the position of the vehicle on the view transformation image that is view-transformed to the third mode. In addition, the driving state guide module 150 may display the caution state through the state bars respectively corresponding to the left side and the left rear side and display the warning state through the state bar corresponding to the rear side among the eight state bars respectively corresponding to the front side, the left front side, the right front side, the left side, the right side, the rear side, the left rear side, and the right rear side of the vehicle.

Figure 8B:
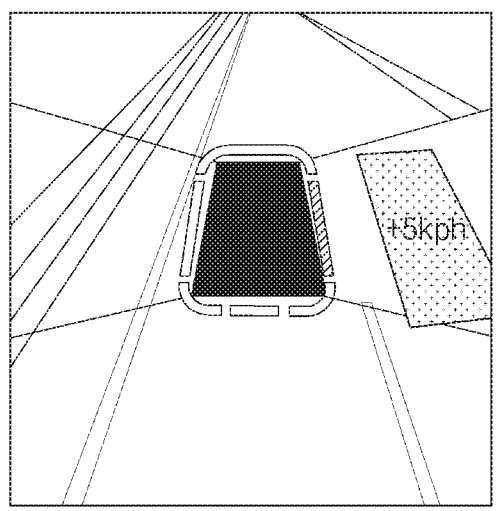

FIG. 8B shows the embodiment in which another vehicle approaching to the vehicle at low speed in the right side of the vehicle exists while the vehicle drives at constant speed of about 60 [kph] or less.

Referring to FIG. 8B, the driving state guide module 150 may display an image and relative speed information corresponding to the other vehicle approaching to the vehicle at low speed in the right side with respect to the position of the vehicle on the view transformation image that is view-transformed to the first mode. In addition, the driving state guide module 150 may display the caution state through the state bar corresponding to the right side among the eight state bars respectively corresponding to the front side, the left front side, the right front side, the left side, the right side, the rear side, the left rear side, and the right rear side of the vehicle.

Figure 8C:
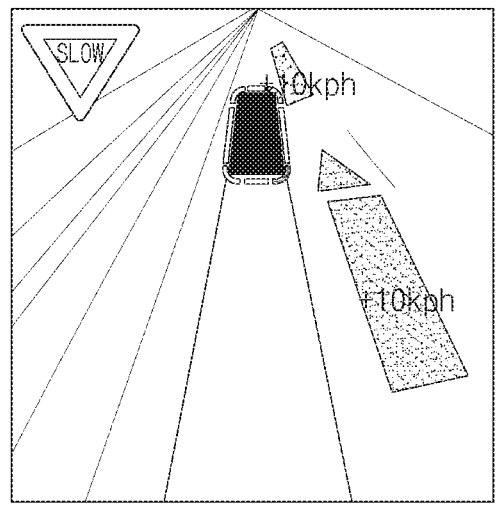

FIG. 8C shows the embodiment in which another vehicle approaching to the vehicle at high speed in the right rear side of the vehicle exists while the vehicle drives at high speed exceeding about 60 [kph].

Referring to FIG. 8C, the driving state guide module 150 may display an image and relative speed information corresponding to the other vehicle approaching to the vehicle at high speed in the right rear side with respect to the position of the vehicle on the view transformation image that is view-transformed to the second mode. In addition, the driving state guide module 150 may display the warning state through the state bar corresponding to the right rear side among the eight state bars respectively corresponding to the front side, the left front side, the right front side, the left side, the right side, the rear side, the left rear side, and the right rear side of the vehicle.

Figure 8D:
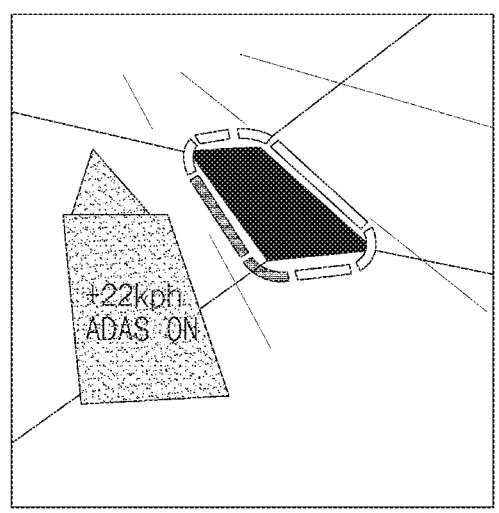

FIG. 8D shows the embodiment in which another vehicle approaching to the vehicle at high speed in the left rear side of the vehicle exists while the vehicle drives at constant speed of about 60 [kph] or less.

Referring to FIG. 8D, the driving state guide module 150 may display an image and relative speed information corresponding to the other vehicle approaching to the vehicle at high speed in the left rear side with respect to the position of the vehicle on the view transformation image that is view-transformed based on the first and fifth modes. In addition, the driving state guide module 150 may receive operation state information of an autonomous driving assist system (ADAS) of the other vehicle approaching to the vehicle at high speed through a vehicle-to-vehicle (V2V) communication system with the other vehicle approaching to the vehicle at high speed and display the operation state information of the autonomous driving assist system (ADAS) on the view transformation image.

In addition, the driving state guide module 150 may display the warning state through the state bars respectively corresponding to the left side and the left rear side among the eight state bars respectively corresponding to the front side, the left front side, the right front side, the left side, the right side, the rear side, the left rear side, and the right rear side of the vehicle.

Figure 8E:
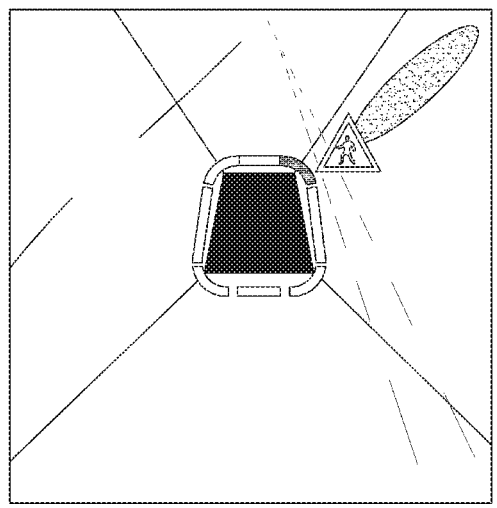

FIG. 8E shows the embodiment in which a pedestrian exists in the right front side while the vehicle drives at constant speed of about 60 [kph] or less.

Referring to FIG. 8E, the driving state guide module 150 may display an icon corresponding to the pedestrian in the right front side with respect to the position of the vehicle on the view transformation image that is view-transformed based on the first mode. In addition, the driving state guide module 150 may display the warning state through the state bar corresponding to the right front side among the eight state bars respectively corresponding to the front side, the left front side, the right front side, the left side, the right side, the rear side, the left rear side, and the right rear side of the vehicle.

Figure 8F:
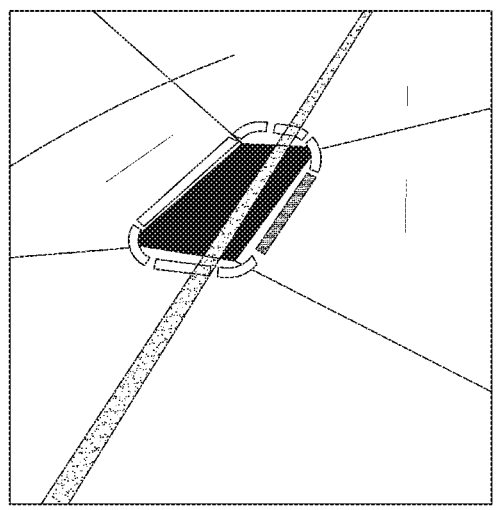

FIG. 8F shows the embodiment in which the vehicle leaves the present driving lane by crossing the right line with respect to the driving direction while the vehicle drives at constant speed of about 60 [kph] or less.

Referring to FIG. 8F, the driving state guide module 150 may display an image corresponding to the right line with respect to the position of the vehicle on the view transformation image that is view-transformed based on the first and sixth modes. In addition, the driving state guide module 150 may display the warning state through the state bar corresponding to the right side among the eight state bars respectively corresponding to the front side, the left front side, the right front side, the left side, the right side, the rear side, the left rear side, and the right rear side of the vehicle.

Figure 8G:
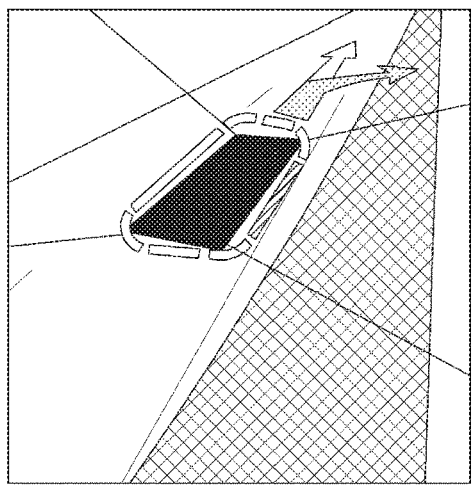
Figure 8H:
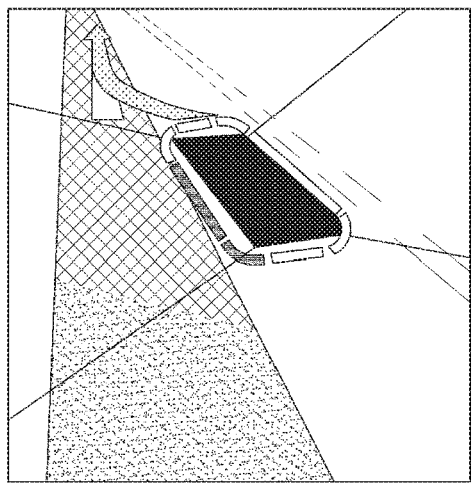

FIGS. 8G and 8H show embodiments in which the right turn signal or the left turn signal is turned on while the vehicle drives at constant speed of about 60 [kph] or less.

Referring to FIG. 8G, the driving state guide module 150 may display an entry possible state on a right lane with respect to the position of the vehicle on the view transformation image that is view-transformed based on the first and sixth modes. In addition, the driving state guide module 150 may display the caution state through the state bar corresponding to the right side among the eight state bars respectively corresponding to the front side, the left front side, the right front side, the left side, the right side, the rear side, the left rear side, and the right rear side of the vehicle. In addition, in a case that an intersection exists on the road ahead, the driving state guide module 150 may display an image and a guide route corresponding to the intersection.

Referring to FIG. 8H, the driving state guide module 150 may display an entry caution state on a left lane with respect to the position of the vehicle on the view transformation image that is view-transformed based on the first and fifth modes. In addition, the driving state guide module 150 may display the warning state through the state bars respectively corresponding to the left side and left rear side among the eight state bars respectively corresponding to the front side, the left front side, the right front side, the left side, the right side, the rear side, the left rear side, and the right rear side of the vehicle. In addition, in a case that a junction exists on the road ahead, the driving state guide module 150 may display an image and a guide route corresponding to the junction.

Figure 8I:
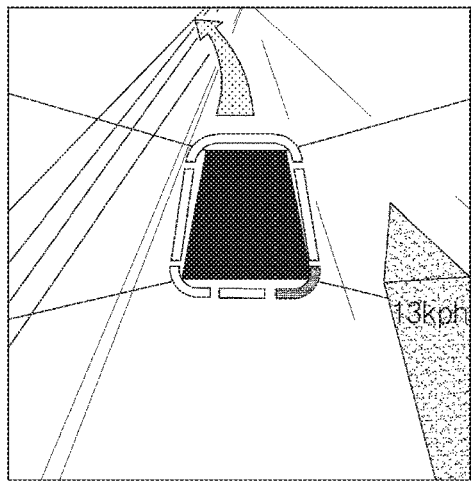

FIG. 8I shows the embodiment in which another vehicle approaches to the vehicle in the right rear side at high speed and a curved lane exists in the road ahead while the vehicle drives at constant speed of about 60 [kph] or less.

Referring to FIG. 8I, the driving state guide module 150 may display an image and relative speed information corresponding to the other vehicle approaching to the vehicle at high speed in the right rear side with respect to the position of the vehicle on the view transformation image that is view-transformed based on the first mode. In addition, the driving state guide module 150 may display the warning state through the state bar corresponding to the right rear side among the eight state bars respectively corresponding to the front side, the left front side, the right front side, the left side, the right side, the rear side, the left rear side, and the right rear side of the vehicle. In addition, the driving state guide module 150 may display an image corresponding to the curved lane existing on the road ahead.

Accordingly, the driver may quickly grasp a current condition of the vehicle through the view transformation image in which the driving state information of the vehicle is displayed as illustratively shown in FIGS. 8A to 8I.

In the above-described embodiments, the color of the state bar may be varied depending on the degree of driving risk, but at least one of the color, the contrast, the shape, or the number of the state bars may be differently displayed according to embodiments and according to the determined degree of driving risk. In addition, various display methods associated with the driving state guide information may be used as long as the driver may distinctly recognize the caution state and the warning state.

Figure 9:
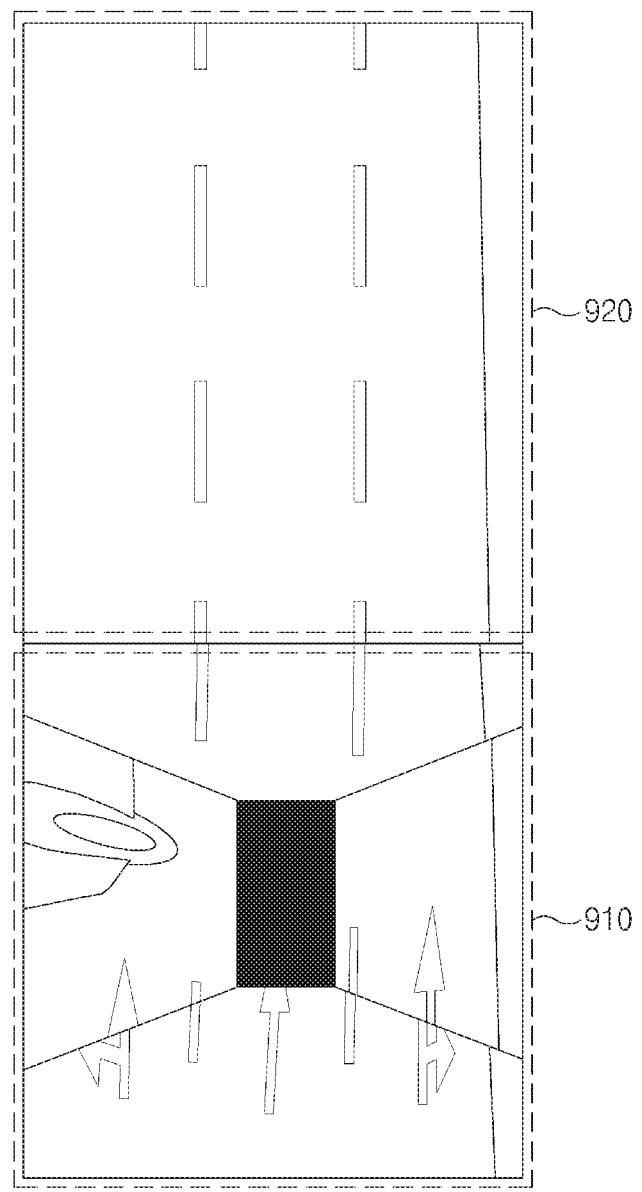
FIG. 9 is a view illustrating an operation of a driving information guide apparatus according to an exemplary embodiment of the present disclosure.

Meanwhile, FIG. 9 is a view illustrating a view transformation image according to another exemplary embodiment of the present invention.

Referring to FIG. 9, the view transformation module 140 may adjust the position and the angle of the virtual camera based on the view mode determined by the determination module 130 in response to the occurrence of the change event and may generate a view transformation image 910 based on the adjusted virtual camera. In this case, the view transformation module 140 may provide a view transformation image obtained by combining a front image 920 with the view transformation image 910. As an example, the front image 920 may be an image taken by a front-facing narrow angle camera installed in front of the vehicle.

In this case, it is possible to provide the view transformation image having an expanded front view.

The driving information guide apparatus 100 operated as described above according to the present embodiment may be implemented in one independent hardware and may be driven by one or more processors, e.g., a microprocessor or a general-purpose computer system. Alternatively, the driving information guide apparatus 100 may be included in other hardware and may rely on the processor(s) of the other hardware for operation.

In addition, the driving information guide apparatus 100 operated as described above according to the present embodiment may be integrally formed with controllers in the vehicle or may be connected to the controllers in the vehicle after being implemented as a separate apparatus.

Hereinafter, an operation of the apparatus according to the present invention will be described.

Figure 10:
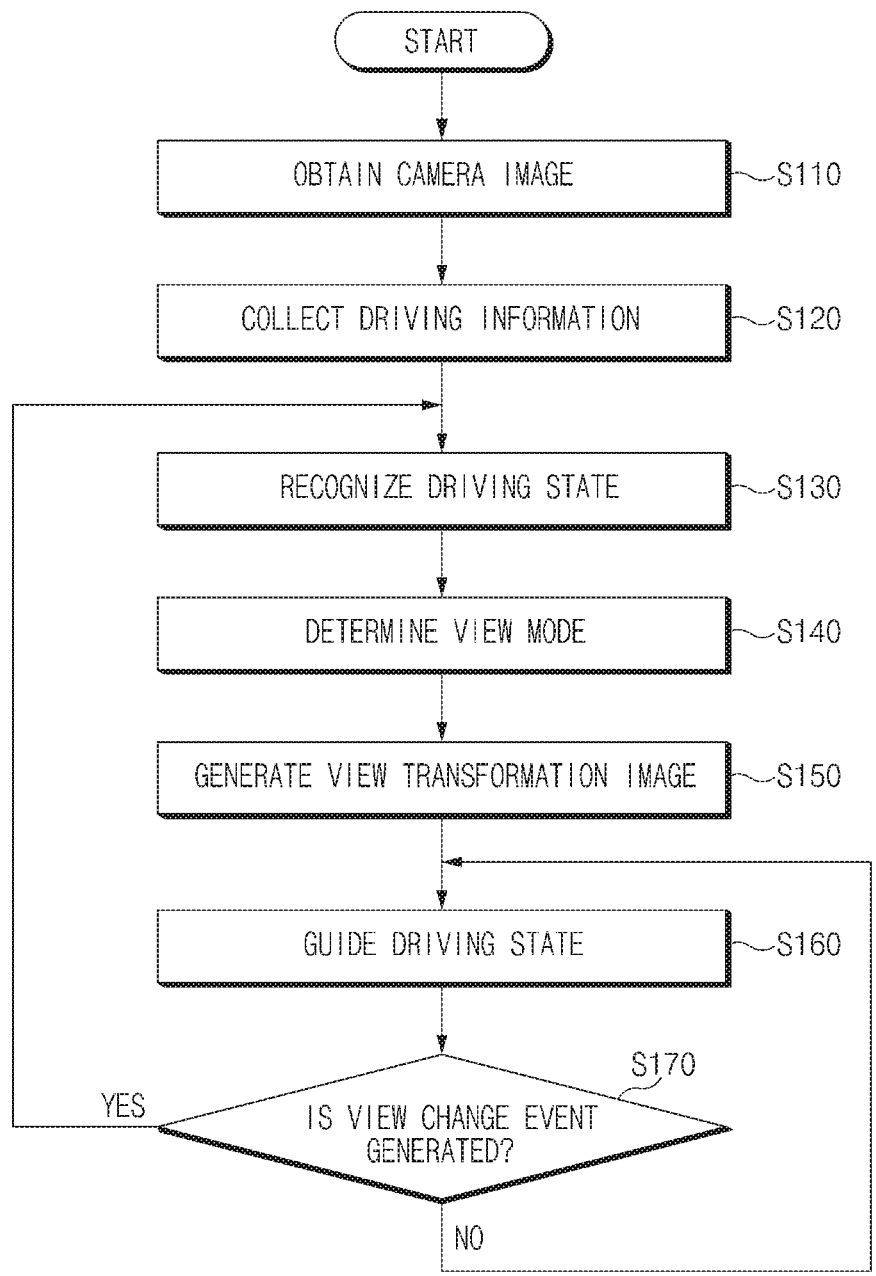
FIG. 10 is a flowchart illustratively showing a driving information guide method according to an exemplary embodiment of the present disclosure.

FIG. 10 is a flowchart illustrating a driving information guide method according to an exemplary embodiment of the present invention.

Referring to FIG. 10, the driving information guide apparatus 100 may obtain the images from around the vehicle, which are taken by the camera system 20, while the vehicle runs (S110) and collect the driving information through the sensors in the vehicle (e.g., sensors of the sensor system 30) and/or the vehicle-to-vehicle (V2V) communication (e.g., through the communication device 40) with the nearby vehicles (S120). In this case, the driving information guide apparatus 100 may recognize the current driving state of the vehicle based on the driving information collected in operation S120 (S130).

As an example, the driving information guide apparatus 100 may recognize various states occurring in or around the vehicle, such as the speed of the vehicle, the driving route of the vehicle, the lane change state of the vehicle, the position of the driving lane of the vehicle, the lane departure state of the vehicle, the operation state of the autonomous driving mode, the obstacle (or the nearby vehicle) approach state with respect to the vehicle, the relative distance, or the relative speed.

The driving information guide apparatus 100 may determine the corresponding view mode based on the current driving state of the vehicle recognized in operation S130 (S140) and perform the view transformation on the images obtained in operation S110 based on the position and the angle of the virtual camera set in the view mode determined in operation S140 to generate the view transformation image (S150).

Then, the driving information guide apparatus 100 may add the state information corresponding to the current driving state of the vehicle to the view transformation image generated in operation S150 and may guide the current driving state of the vehicle to the driver through the display screen (S160).

In a case that another view transformation event occurs while the current driving state of the vehicle is guided in operation S160 (S170), the driving information guide apparatus 100 may re-perform operations S130 to S160 to guide the current driving state of the vehicle corresponding to the newly-occurred view transformation event to the driver.

Figure 11:
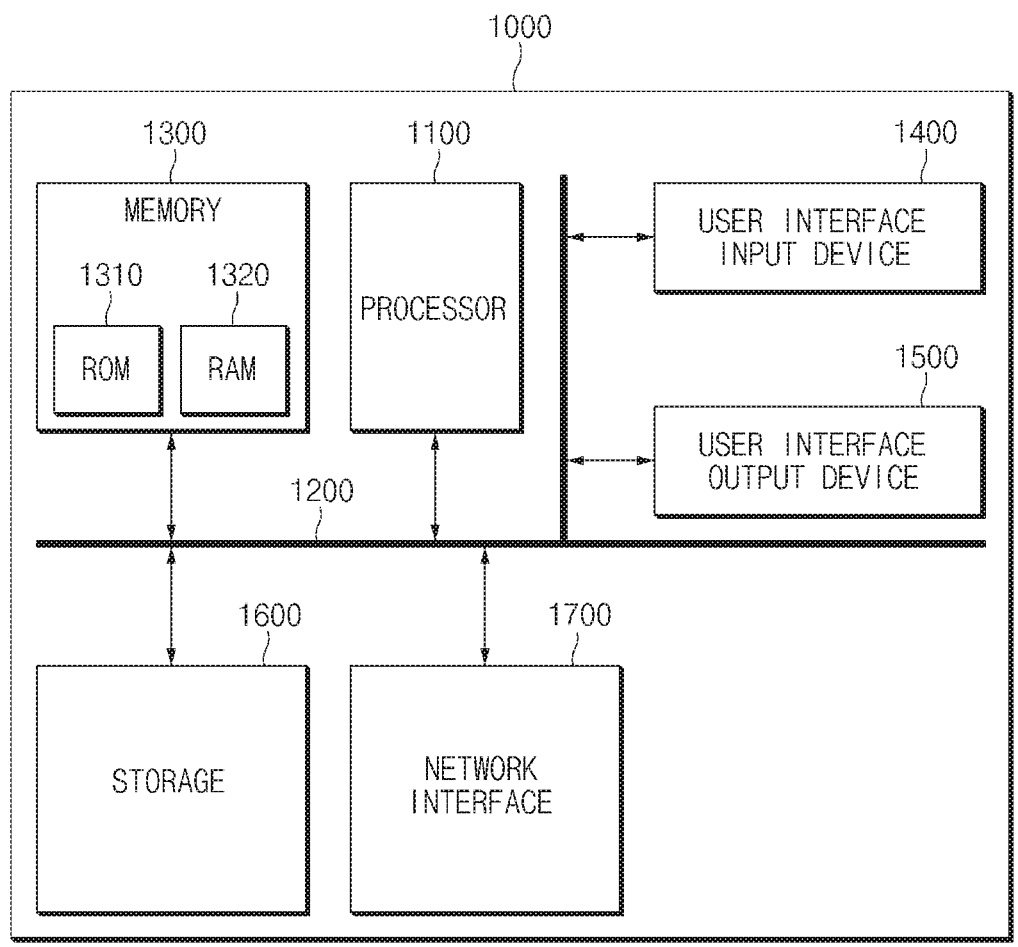
FIG. 11 is a block diagram illustrating a configuration of a computing system that can execute a driving information guide method according to an exemplary embodiment of the present disclosure.

FIG. 11 is a block diagram illustrating a configuration of a computing system that executes a driving information guide method according to an exemplary embodiment of the present invention. The computing system shown in FIG. 11 may be used to implement one or more elements shown in FIG. 1.

Referring to FIG. 11, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing programming instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

While the present invention has been described with reference to exemplary embodiments, it will be apparent to those skilled in the art that various changes and modifications may be made without departing from the spirit and scope of the present invention.

Therefore, exemplary embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A driving information guide apparatus of a vehicle comprising:
   a controller communicatively connected to a display screen and at least one of a sensor system and a communication device, and receiving driving information of the vehicle through the at least one of the sensor system and the communication device; and
   a processor communicatively connected to the controller and configured to:
     collect driving information received through the controller and at least one of the sensor system and the communication device while the vehicle runs and recognize a current driving state of the vehicle based on the collected driving information;
     determine a view mode based on a speed of the vehicle and a driving direction of the vehicle;
     view-transform images around the vehicle, which are taken by a camera system, based on a position and an angle of a virtual camera corresponding to the determined view mode, and generate a view transformation image for display on the display communicatively connected to the processor through the controller; and
     display state information corresponding to the recognized driving state of the vehicle through the view transformation image on the display screen communicatively connected through the controller,
   wherein the processor is configured to display a degree of driving risk and direction information of the vehicle in the view transformation image based on state information according to an approach state of an obstacle or a nearby vehicle, state information according to, a position of a driving lane of the vehicle, and state information according to a lane change of the vehicle,
   wherein the processor is configured to display a plurality of bars indicative of the state information and respectively positioned around the vehicle in the view transformation image, and to display a corresponding stage among multiple stages of the degree of driving risk through the bars, and
   wherein the processor is configured to display the bars separately in directions around the vehicle and differently display one or more of a color, contrast, shape, or number of one or more bars in a direction in which a difference in driving risk occurred in accordance with the degree of the driving risk.

2. The driving information guide apparatus of claim 1, wherein the view mode is selected from among first, second, third, and fourth modes in which the position and the angle of the virtual camera with respect to forward and backward directions of the vehicle are differently set in accordance with the speed of the vehicle, and from among fifth and sixth modes in which a position and an angle of the virtual camera with respect to left and right directions are differently set in accordance with the driving direction of the vehicle.

3. The driving information guide apparatus of claim 2, wherein the processor is configured to determine a view transformation mode to a first mode in which a reference position and a reference angle of the virtual camera are set with respect to the forward and backward directions and the left and right directions in a case that the vehicle runs straightly at constant speed.

4. The driving information guide apparatus of claim 3, wherein the processor is configured to determine whether a view transformation event occurs in the speed and the driving direction of the vehicle during the first mode.

5. The driving information guide apparatus of claim 3, wherein, in a case that the vehicle runs at high speed exceeding a predetermined speed, the processor is configured to determine the view mode to be the second mode in which the position of the virtual camera is set behind the reference position of the virtual camera and the angle of the virtual camera is set to an angle smaller than the reference angle of the virtual camera with respect to the forward and backward directions of the vehicle.

6. The driving information guide apparatus of claim 3, wherein, in a case that the vehicle runs at low speed smaller than a predetermined speed, the processor is configured to determine the view mode to be the third mode or the fourth mode each in which the position of the virtual camera is set ahead of the reference position of the virtual camera and the angle of the virtual camera is set to an angle greater than the reference angle of the virtual camera with respect to the forward and backward directions of the vehicle.

7. The driving information guide apparatus of claim 3, wherein, in a case that a left turn signal of the vehicle is turned on or the vehicle leaves a driving lane by crossing a left line with respect to the driving direction, the processor is configured to determine the view mode to be the fifth mode in which the position of the virtual camera is set to the left of the reference position of the virtual camera and the angle of the virtual camera is set to an angle smaller than the reference angle to the left direction with respect to the left and right directions of the vehicle.

8. The driving information guide apparatus of claim 3, wherein, in a case that a right turn signal of the vehicle is turned on or the vehicle leaves a driving lane by crossing a right line with respect to the driving direction, the processor is configured to determine the view mode to be the sixth mode in which the position of the virtual camera is set to the right of the reference position of the virtual camera and the angle of the virtual camera is set to an angle smaller than the reference angle to the right direction with respect to the left and right directions of the vehicle.

9. The driving information guide apparatus of claim 2, wherein the processor is configured to continuously adjust the position and the angle of the virtual camera to provide a view in which the position and the angle of the camera is set between at least two set positions and angles of the first, second, third, and fourth modes, and wherein the processor continuously adjusts the position and the angle of the virtual camera based on a value obtained by interpolating parameter values corresponding to at least two modes among the first to sixth modes.

10. The driving information guide apparatus of claim 1, wherein the processor is configured to determine the view mode in response to an input signal input by a user.

11. The driving information guide apparatus of claim 1, wherein the processor is configured to display an image corresponding to the obstacle or the nearby vehicle through a corresponding position of the view transfonnation image based on the state information according to the approach state of the obstacle or the nearby vehicle and to display the state information.

12. The driving information guide apparatus of claim 1, wherein the processor is configured to display an image corresponding to a line in a direction in which the vehicle leaves the driving lane in the view transformation image based on the state information according to the position of the driving lane of the vehicle and to display guide route information.

13. The driving information guide apparatus of claim 1, wherein the processor is configured to display caution state information according to a lane entry in the view transformation image based on the state information according to the lane change of the vehicle and to display guide route information ahead of the vehicle.

14. The driving information guide apparatus of claim 1, wherein the processor is configured to output an alarm sound with the view transformation image depending on a degree of driving risk of the vehicle.

15. The driving information guide apparatus of claim 1, wherein the processor is configured to recognize at least one of the speed of the vehicle, a driving route, a lane change state, a position of driving lane, a lane departure state, an operation state of an autonomous driving mode, an obstacle approach state, a distance between the vehicle and the obstacle, or a relative speed between the vehicle and the obstacle.

16. The driving information guide apparatus of claim 1, wherein the processor is configured to collect the driving information using a plurality of sensors of the sensor system installed in the vehicle, or
through the communication device providing communications through a vehicle-to-vehicle (V2V) communication between the vehicle and a nearby vehicle.

17. A driving information guide method comprising:
obtaining images around a vehicle, which are taken by a camera system of the vehicle while the vehicle runs;
collecting driving information of the vehicle, including a speed of the vehicle and a driving direction of the vehicle, by a processor of the vehicle communicatively connected to the camera system of the vehicle, while the vehicle runs and identifying a current driving state of the vehicle based on the collected driving information;
determining, by the processor, a view mode based on the speed of the vehicle and the driving direction of the vehicle;
view-transforming the images around the vehicle, by the processor, based on a position and an angle of a virtual camera corresponding to the determined view mode to generate a view transformation image; and
displaying, on a display communicatively connected to the processor of the vehicle, state information corresponding to the recognized driving state of the vehicle through the view transformation image, wherein the step of displaying state information comprises:
displaying a plurality of bars separately in directions around the vehicle,
displaying a degree of driving risk and direction information of the vehicle in the view transformation image based on state information according to an approach state of an obstacle or a nearby vehicle, state information according to a position of a driving lane of the vehicle, and state information according to a lane change of the vehicle, and
displaying the bars indicative of the state information and respectively positioned around the vehicle in the view transformation image, to display a corresponding stage among multiple stages of the degree of driving risk through the bars, and
differently displaying one or more of a color, contrast, shape, or number of one or more bars in a direction in which a difference in driving risk occurred in accordance with the degree of the driving risk.

18. A vehicle system comprising:
an interface configured to display driving state information of a vehicle through a display screen;
a camera system configured to take images around the vehicle while the vehicle runs;
a sensor system configured to measure a driving state of the vehicle while the vehicle runs;
a communication device configured to communicate with a nearby vehicle to receive information about the nearby vehicle; and
a driving information guide device configured to:
collect driving information of the vehicle while the vehicle runs to recognize a current driving state of the vehicle based on the collected driving information;
view-transform the images taken around the vehicle, which are taken by the camera system, based on a position and an angle of a virtual camera corresponding to a view mode determined depending on a speed of the vehicle and a driving direction of the vehicle to generate a view transformation image; and
display, on the display screen of the interface, state information corresponding to the recognized driving state of the vehicle through the view transformation image,
wherein the driving information guide device is configured to display a degree of driving risk and direction information of the vehicle in the view transformation image based on state information according to an approach state of an obstacle or a nearby vehicle, state information according to a position of a driving lane of the vehicle, and state information according to a lane change of the vehicle,
wherein the driving information guide device is configured to display a plurality of bars indicative of the state information and respectively positioned around the vehicle in the view transformation image, to display a corresponding stage among multiple stages of the degree of driving risk through the bars, and
wherein the driving information guide device is configured to display the bars separately in directions around the vehicle and to differently display one or more of a color, contrast, shape, or number of one or more bars in a direction in which a difference in driving risk occurred in accordance with the degree of the driving risk.

* * * * *